(12) United States Patent
Lipson et al.

(10) Patent No.: US 11,194,223 B2
(45) Date of Patent: Dec. 7, 2021

(54) DENSELY-PACKED OPTICAL PHASED ARRAYS VIA K-VECTOR MISMATCH AND METAMATERIAL RODS

(71) Applicant: The Trustees of Columbia University in the City of New York, New York, NY (US)

(72) Inventors: Michal Lipson, New York, NY (US); Christopher Thomas Phare, New York, NY (US); Moshe Zadka, Bronx, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/626,635

(22) PCT Filed: Jun. 26, 2018

(86) PCT No.: PCT/US2018/039559
§ 371 (c)(1),
(2) Date: Dec. 26, 2019

(87) PCT Pub. No.: WO2019/190577
PCT Pub. Date: Oct. 3, 2019

(65) Prior Publication Data
US 2020/0225558 A1    Jul. 16, 2020

Related U.S. Application Data

(60) Provisional application No. 62/524,880, filed on Jun. 26, 2017.

(51) Int. Cl.
*G02B 6/12* (2006.01)
*G02B 6/125* (2006.01)
(Continued)

(52) U.S. Cl.
CPC .......... *G02F 1/2955* (2013.01); *G02B 6/125* (2013.01); *G02B 6/12011* (2013.01);
(Continued)

(58) Field of Classification Search
None
See application file for complete search history.

(56) References Cited

U.S. PATENT DOCUMENTS 6,526,203 B1 * 2/2003 Gonzalez ........... G02B 6/12016
385/24
6,853,769 B2 * 2/2005 McGreer ............... G02B 6/105
385/10

(Continued)

FOREIGN PATENT DOCUMENTS

WO   2019/190577 A2   10/2019

OTHER PUBLICATIONS

Abediasl et al., "Monolithic optical phased-array transceiver in a standard SOI CMOS process", Optics Express, 2015, vol. 23, Issue 5, 6509-6519.

(Continued)

*Primary Examiner* — Rhonda S Peace
(74) *Attorney, Agent, or Firm* — BakerHostetler

(57) ABSTRACT

A method of forming an emitting array of waveguides, comprising providing a plurality of waveguides that exhibit different propagation constants so as to ensure that nearby waveguides do not couple evenly over parallel propagation lengths by varying a length in one or more dimensions of respective waveguides, whereby the respective waveguides are phase mismatched with at least their nearest neighbor.

29 Claims, 7 Drawing Sheets

(51) Int. Cl.
G02F 1/295 (2006.01)
G02B 6/122 (2006.01)
G02F 1/29 (2006.01)
G02F 1/35 (2006.01)
H01Q 13/28 (2006.01)

(52) U.S. Cl.
CPC ........... G02B 6/1228 (2013.01); G02F 1/292 (2013.01); G02F 1/3544 (2013.01); H01Q 13/28 (2013.01); G02F 2202/30 (2013.01)

(56) References Cited

U.S. PATENT DOCUMENTS

| | | | |
|---|---|---|---|
| 7,068,888 | B1 | 6/2006 | Pietro |
| 7,848,602 | B2 | 12/2010 | Kim et al. |
| 9,274,276 | B2 | 3/2016 | Jahani et al. |
| 9,310,471 | B2 | 4/2016 | Sayyah et al. |
| 10,684,527 | B2 * | 6/2020 | Watts .................. G02B 6/29331 |
| 10,866,359 | B2 * | 12/2020 | Goodwill ........... G02B 6/12004 |
| 2010/0130069 | A1 | 5/2010 | Fyne |
| 2012/0230628 | A1 | 9/2012 | Hill et al. |
| 2015/0049998 | A1 * | 2/2015 | Dumais .................... G02B 6/04 385/115 |
| 2016/0231506 | A1 | 8/2016 | Wei |
| 2017/0068097 | A1 | 3/2017 | Honea et al. |
| 2020/0225558 | A1 * | 7/2020 | Lipson .................. G02F 1/3544 |

OTHER PUBLICATIONS

Almeida et al., "Nanotaper for compact mode conversion," Opt. Letters, 2003, 28(15), 1302-1304.
Baba et al., "Slow-light Mach-Zehnder modulators based on Si photonic crystals," Sci. Technol. Adv. Mater., 2014, 15(2), 024602, 11 pages.
Biswajeet et al., "Athermal silicon microring resonators with titanium oxide cladding," Opt. Express, 2013, 21, 26557-26563.
Cardenas et al., "High coupling efficiency etched facet tapers in silicon waveguides," IEEE Photon. Technol. Lett., 2014, 26, 2380-2382.
Fischer et al., "Integrating MEMS and ICs," Microsystems & Nanoengineering, 2015, 1, 15005, 16 pages.
Gondarenko et al., "High confinement micron-scale silicon nitride high Q ring resonator," Opt. Express, 2009, 17(14), 11366-11370.
Griffith et al., "Silicon-chip mid-infrared frequency comb generation," Nat. Commun., 2015, 6, 6299, 5 pages.
Hulme et al., "Fully integrated hybrid silicon two dimensional beam scanner," Opt. Express, Mar. 2015, 23(5), 5861-5874.
Hutchison et al., "High-resolution aliasing-free optical beam steering," Optica, Aug. 2016, 3, 887-890.
Jahani et al., "Controlling evanescent waves using silicon photonic all-dielectric metamaterials for dense integration" Nature Communications, 2018, 9, 1893, 9 pages.
Kastenmeier et al., "Highly selective etching of silicon nitride over silicon and silicon dioxide", J. Vac. Sci. Technol. A, 1999, 17(6), 3179-3184.
Komljenovic, et al., "Sparse aperiodic arrays for optical beam forming and LIDAR," Opt. Express, 2017, 25, 2511-2528.
Kwong et al., "1x12 Unequally spaced waveguide array for actively tuned optical phased array on a silicon nanomembrane," Appl. Phys. Lett., 2011, 99, 051104, 3 pages.
Kwong et al., "Corrugated waveguide based optical phased array with crosstalk suppression", IEEE Photonics Technology Letters, May 2014, vol. 26, Issue 10, 991-994.
Kwong et al., "On-chip silicon optical phased array for two-dimensional beam steering", Optics Letters, Feb. 2014, vol. 39, No. 4, 941-944.
Lee et al., "Back-End Deposited Silicon Photonics for Monolithic Integration on CMOS," IEEE J. Sel. Topics Quantum Electron., 2013, 19(2), 8200207, 7 pages.
Lee et al., "High power and widely tunable Si hybrid external-cavity laser for power efficient Si photonics WDM links" Optics Express, 2014, 22, 7678-7685.
Luke et al., "Overcoming Si3N4 film stress limitations for high quality factor ring resonators", Opt. Express, Sep. 2013, 21, 19.
Luo et al., "High quality factor etchless silicon photonic ring resonators", Opt. Express, 2011, vol. 19, No. 7, 6284-6289.
Manipatruni et al., "Ultra high bandwidth WDM using silicon microring modulators", Opt. Express, 2010, vol. 18, No. 16, 16858-16867.
Morton et al., "Fast Thermal Switching of Wideband Optical Delay Line with no Long-Term Transient", IEEE Phot. Tech. Lett., 2012, 24, 512-514.
Padmaraju et al., "Thermal stabilization of a microring modulator using feedback control," Opt. Express, 2012, 20, 27999-28008.
Poulton et al., "MIT and DARPA pack LIDAR sensor onto single chip", IEEE Spectrum, Aug. 2016, 7 pages.
Powell, "An efficient method for finding the minimum of a function of several variables without calculating derivatives," Comput. J. 7, 155-162 (1964).
Roelkens et al., "High efficiency Silicon-on-Insulator grating coupler based on a poly-Silicon overlay", Opt. Express, 2006, 14, 11622-11630.
Satyan et al. "Precise control of broadband frequency chirps using optoelectronic feedback." Optics express, 2009, 17(18), 15991-15999.
See for example Macom's collaboration with Molex inc http://ir.macom.com/releasedetail.cfm?releaseid=832255.
Sherwood-Droz et al., "Scalable 3D dense integration of photonics on bulk silicon." Optics Express, 2011, 19, 17758-17765.
Smigaj et al., "Magneto-optical circulator designed for operation in a uniform external magnetic field." Optics letters, 2010, 35(4), 568-570.
Soldano et al., "Optical Multi-Mode Interference Devices Based on Self-Imaging: Principles and Applications," J. Lightwave Technol., 1995, 13(4), 615-627.
Song et al., "3D Integrated Hybrid Silicon Laser", Optics Express, 2016, 24, 10435-10444.
Song et al., "High-density waveguide superlattices with low crosstalk", Nature Communications, 2015, 7027, 9 pages.
Sun et al., "Large-scale nanophotonic phased array", Nature, Jan. 2013, 493, 195-199.
TriQuint, "TAT7469 Optical TIA Evaluation Board," TAT7469 evaluation board datasheet, 2013.
Tzuang et al., "Non-reciprocal phase shift induced by an effective magnetic flux for light", Nat. Photon., 2014, 1-11.
Van Laere et al., "Compact and Highly Efficient Grating Couplers Between Optical Fiber and Nanophotonic Waveguides," J. Lightwave Technol., 2007, 25, 151-156.
Vermeulen et al., "High-efficiency fiber-to-chip grating couplers realized using an advanced CMOS-compatible Silicon-On-Insulator platform", Opt. Express, 2010, 18, 18278-18283.
Watts et al., "Adiabatic resonant microrings (ARMs) with directly integrated thermal microphotonics." Conference on Lasers and Electro-Optics., Optical Society of America, 2009.
Xenon Difluoride Etching System, Chapter 7.11, UC Berkeley, Marvell Nanofabrication laboratory, 2016, https://nanolab.berkeley.edu/labmanual/chap7/7.05xetch.pdf, https://docs.google.eom/document/d/1s2vEfGx6y_3xvdNfBzoJp6xy3pOAvk5JWBpj-2Wecbw/edit.
Xu et al., "Micrometre-scale silicon electro-optic modulator," Nature, 2005, 435, 325-327.
Yoo et al., "A 32 x 32 optical phased array using polysilicon sub-wavelength high-contrast-grating mirrors", Optics Express, 2014, vol. 22, Issue 16, 19029-19039.
Zhong et al., "Focusing-curved subwavelength grating couplers for ultra-broadband silicon photonics optical interfaces," Optics Express, 2014, 22(15), 18224-18231.
Zhou et al., "Effect of carrier lifetime on forward-biased silicon Mach-Zehnder modulators," Opt. Express, 2008, 16, 5218-5226.
Zhu et al., "4×44 GB/s Packet-Level Switching in a Second-Order

(56) References Cited

OTHER PUBLICATIONS

Microring Switch," IEEE Photon. Technol. Lett., 2012, 24(17), 1555-1557.

\* cited by examiner

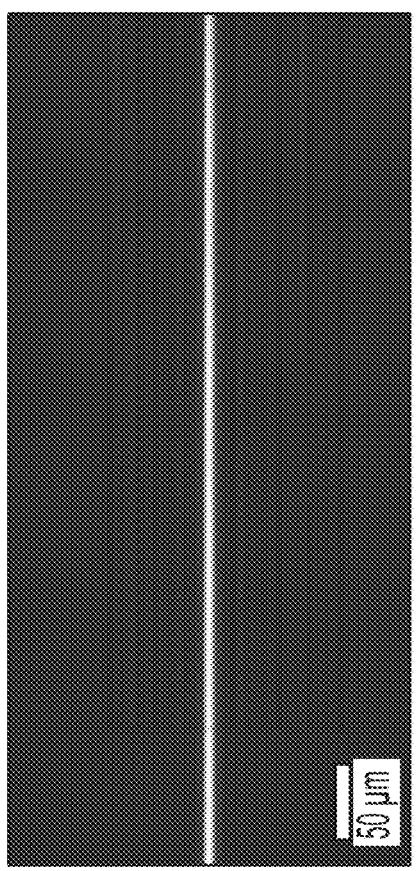
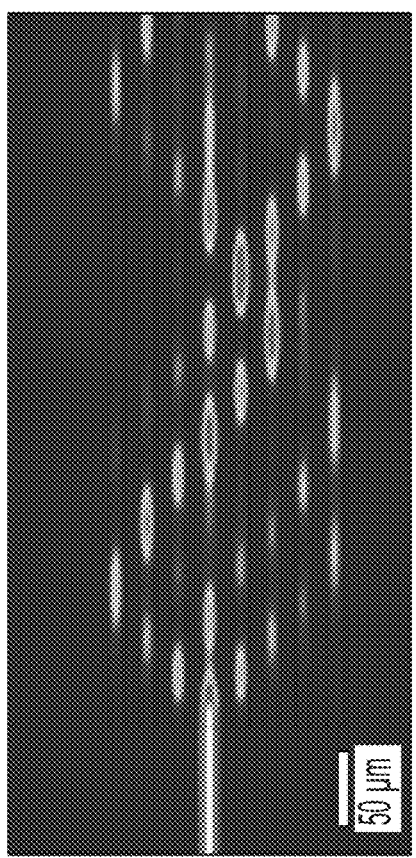
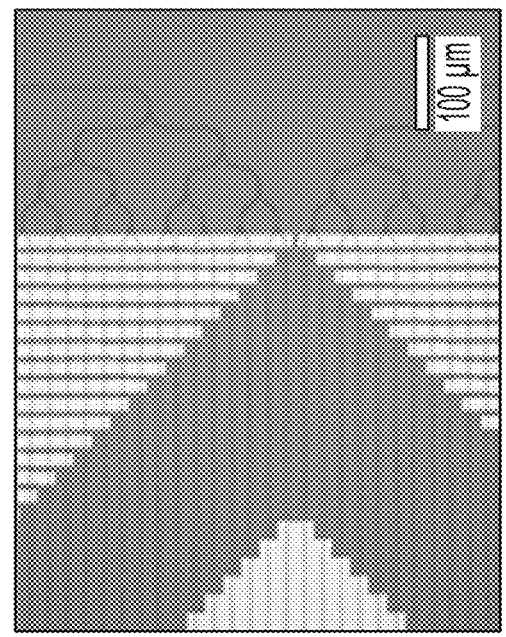
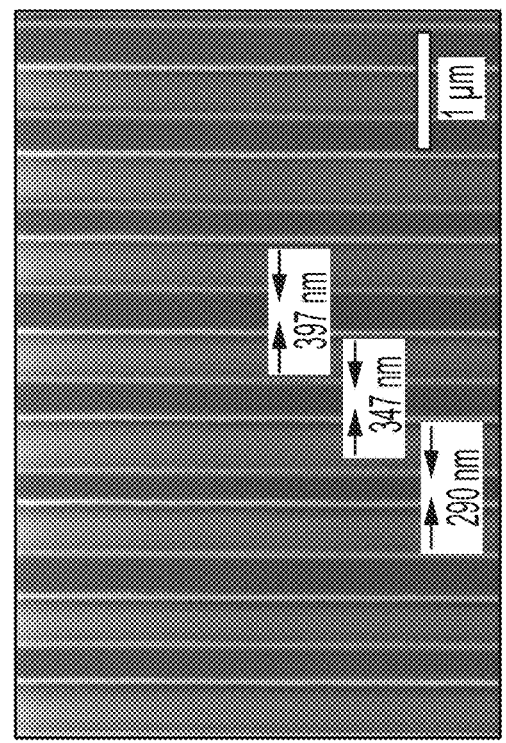
FIG. 1A
FIG. 1B
FIG. 1C
FIG. 1D

DENSELY-PACKED OPTICAL PHASED ARRAYS VIA K-VECTOR MISMATCH AND METAMATERIAL RODS

CROSS-REFERENCE TO RELATED APPLICATIONS

This application is the National Stage Application of International Patent Application No. PCT/US2018/039559 filed Jun. 26, 2018, which claims priority from U.S. Provisional Patent Appl. Ser. No. 62/524,880, filed Jun. 26, 2017, the disclosures of each of which are incorporated herein by reference in their entireties for any and all purposes.

GOVERNMENT RIGHTS

This invention was made with Government support under DARPA-BAA-16-13 awarded by DOD/DARPA. The Government has certain rights in the invention.

TECHNICAL FIELD

Optical phased arrays are described in which the widths of the waveguides vary periodically across the array to avoid coupling. Using index-mismatched waveguides, optical phased arrays with tightly-spaced waveguides of unequal widths but half-wavelength emitter pitch may be used, for example, to provide sidelobe-free beam formation over the entire 180° field of view and beam formation up to 60° off-axis.

BACKGROUND

Integrated optical phased arrays have gathered significant interest to form and scan laser beams for applications including free-space communications, holography, and light detection and ranging (LIDAR). Those skilled in the art will appreciate that LIDAR is a key enabling sensor for autonomous vehicles, drone navigation, augmented reality, and human-robot interaction but is currently extremely large and expensive. Small, light, and cheap solid-state LIDAR sensors remain desirable. Critical for these applications is the ability to address a single isolated beam over a wide family of angles (field of view); however, most optical phased arrays to date suffer from additional aliased grating lobes at regular angles because their emitters are spaced farther apart than the desired one-half wavelength, limiting the maximum uniquely addressable angle to typically 20-30°. As illustrated in FIG. 1A, sub-wavelength spacing is difficult to achieve because of strong evanescent coupling between closely-spaced dielectric waveguides.

In an optical phased array, a large number of regularly-spaced on-chip waveguides (wires for light, or "emitters", made of any dielectric or semiconductor material) each carry an optical signal, which, after leaving the chip, combine into a single narrow beam. The angle the beam points towards can be controlled by changing the relative phase of each emitter. The spacing between adjacent emitters controls several important properties, primarily (1) the range of unique angles the beam can be pointed to without aliasing and (2) the efficiency with which light can be coupled in reverse back into the array from free space. It is useful for both of these properties to be able to space the waveguides at one-half the light wavelength ($\lambda/2$), but traditionally this is very hard because very closely-spaced waveguides couple between themselves and destroy the desired phase and amplitude profile.

Several groups, including Tin Komljenovic, et al., "Sparse aperiodic arrays for optical beam forming and LIDAR," Opt. Express 25, 2511-2528 (2017); D. N. Hutchison et al., "High-resolution aliasing-free optical beam steering," Optica 3, 887-890 (2016); and David Kwong et al., "1×12 Unequally spaced waveguide array for actively tuned optical phased array on a silicon nanomembrane," Appl. Phys. Lett. 99, 051104 (2011), have addressed the aliasing problem of large evenly-spaced arrays by using large but unequal spacing between adjacent emitters, which avoids constructive interference towards the off-axis grating lobes. Such groups have also attempted to eliminate grating lobes by using non-uniform spacing on a coarse ($>\lambda/2$) phased array, but this approach lowers the percentage of power in the main beam and also the overlap efficiency of the received reflection. Such designs thus sacrifice power directed toward the target.

Others, such as W. Song et al. in Nature Communications, 6 (2015), p. 7027, have discussed k-vector mismatch. However, Song et al. do not demonstrate their device in a phased array, do not discuss how to transition between coarse-pitch and fine pitch waveguide arrays without coupling, and do not discuss methods for optimizing the overlap efficiency.

It is desired to provide a much wider range of possible beam emission angles because by allowing $\lambda/2$ emitter spacing and to achieve a higher receive efficiency by enabling the emitter modes to be "close" to each other, thereby minimizing the dead area between emitters where incoming light would not couple back into a waveguide.

Recently, Jahani et al., "Controlling evanescent waves using silicon photonic all-dielectric metamaterials for dense integration" Nature Communications 9:1893 (2018) shown that by placing sub-wavelength metamaterial structures near the waveguide, it is possible to reduce the evanescent tail of the light, thus reducing the crosstalk between adjacent waveguides. By surrounding the main waveguide with metamaterial rods, an increase in the anisotropy of the material ($\varepsilon\_2z \gg 1$) may be realized such that the decay constant of evanescent waves $k_x''/k_0$ is increased, thus reducing crosstalk.

SUMMARY

By varying the widths of the waveguide periodically across an optical phased array (for example, 300 nm, 350 nm, 400 nm, 300 nm, 350 nm, 400 nm, 300 nm, . . . , left to right), coupling of light between waveguides is avoided. Changing the waveguide width changes its effective index, and waveguides with different effective indices couple much more weakly. A set of two or more widths is chosen (three is typical) so that waveguides with the same width are spaced far enough apart to not couple even though their effective indices match. The width of the waveguides are chosen both to maximize the difference in effective index (i.e. minimize the coupling) and to maximize the fill factor of the mode to maximize the efficiency of coupling from a free-space plane wave back into the waveguides. By segmenting the waveguide we can alternate between the different widths and still maintain crosstalk free light propagation. This allows for embedding grating in proximity to the waveguides, emitting light out-of-plane of the device. By designing the period of the grating for each propagation constant (for each waveguide width), it is possible to direct the out-going light to the same direction. By embedding metamaterial rods in between the waveguides we further reduce the crosstalk between waveguides, allowing for longer propagation free of crosstalk.

Exemplary embodiments are also characterized by transitioning from a coarsely-spaced array of waveguides with equal width to the above described tightly-spaced array of unequal widths. First, the waveguides are tapered while still coarsely spaced to their final widths. Then, the waveguides are bent 90 degrees with equal radii, with the position of the bend staggered such that the bend ends with the desired fine spacing (with the array now rotated 90 degrees from the input). The bend radii are designed so that the waveguide effective index in the bend is not significantly perturbed from its straight-waveguide value and also avoids coupling into higher-order modes.

In an exemplary embodiment, a method of forming an optical phased array half-wavelength uniform emitter pitch comprises providing a plurality of waveguides that are phase mismatched so as to ensure that nearby waveguides do not couple even over long parallel propagation lengths by varying the widths of respective waveguides in a regular pattern whereby the respective waveguides are phase-mismatched with at least their nearest neighbor and their second-nearest neighbor waveguide. In the exemplary embodiments, the widths of the respective waveguides are varied periodically across the optical phased array. For example, the widths of the respective waveguides may be varied in a pattern of repeating widths of 300 nm, 350 nm, and 400 nm.

In further exemplary embodiments, the method includes tapering the respective waveguides to a tightly-spaced optical phased array having the widths of respective waveguides in the regular pattern by tapering each waveguide to its width in the pattern and bending each waveguide approximately 90° from an input with equal radii with a position of a bend staggered such that the bend ends with a desired spacing of the waveguides in the regular pattern. In the exemplary embodiments, the bend radii is selected whereby a waveguide effective index in the bend is not significantly perturbed from a straight waveguide effective index value and whereby coupling of light into higher modes is substantially avoided.

An optical phased array resulting from such a method has a half-wavelength uniform emitter pitch and includes a plurality of waveguides that are phase mismatched so as to ensure that nearby waveguides do not couple even over long parallel propagation lengths. The waveguides are disposed in a regular array pattern whereby the widths of the respective waveguides are varied in a regular pattern such that the respective waveguides are phase-mismatched with at least their nearest neighbor and their second-nearest neighbor waveguide. In the exemplary embodiments, the widths of the respective waveguides are varied periodically in, for example, a pattern of repeating widths of 300 nm, 350 nm, and 400 nm. The respective waveguides are tapered to a tightly-spaced optical phased array having a width of the respective waveguide in the regular pattern, and each respective waveguide is bent approximately 90° from an input with equal radii with a position of a bend staggered such that the bend ends with a desired spacing of the waveguides in the regular pattern. In exemplary embodiments, the waveguide effective index in the bend is not significantly perturbed from a straight waveguide effective index value.

In an exemplary embodiment, a method of forming an optical phased array half-wavelength uniform emitter pitch comprises providing a plurality of segments of waveguides that are phase mismatched so as to ensure that nearby waveguides do not couple and embedding gratings on top or side of the waveguide to emit light out-of-plane.

In an exemplary embodiment, a method of forming an optical phased array half-wavelength uniform emitter pitch comprises providing a plurality of segments of waveguides that are phase mismatched and metamaterial rods in between so as to ensure that nearby waveguides do not couple and embedding gratings on top or side of the waveguide to emit light out-of-plane.

BRIEF DESCRIPTION OF THE DRAWINGS

The above and other objects and advantages of the invention will be apparent to those skilled in the art based on the following detailed description in conjunction with the appended figures, of which:

FIG. 1A illustrates eigenmode expansion simulation of power propagation in a 0.5 mm-long, 8 waveguide array with 775 nm pitch and equal 400 nm widths.

FIG. 1B illustrates propagation in an exemplary 300, 350, and 400 nm width array, with light launched into a single 300 nm width waveguide, showing negligible coupling between adjacent waveguides over the same length.

FIG. 1C illustrates a scanning electron micrograph of the fabricated waveguide array with unequal widths.

FIG. 1D illustrates an optical microscope image of a splitter tree and a thermo-optic phase shifter array.

DETAILED DESCRIPTION OF ILLUSTRATIVE EMBODIMENTS

Figure 2B:
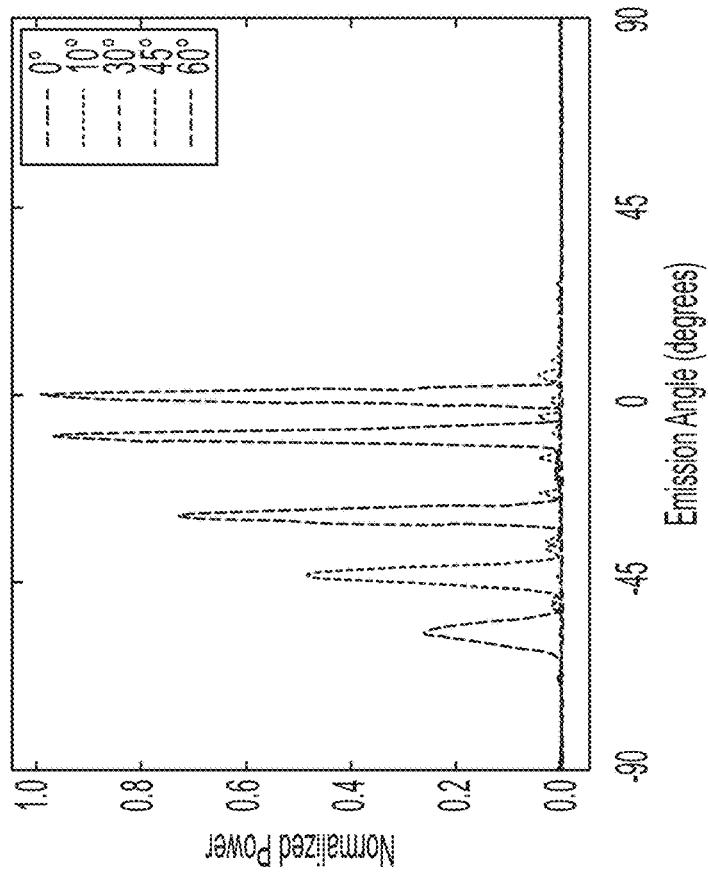
FIG. 2B illustrates simulated far-field beam profiles for a perfectly-aligned output phase.

An exemplary embodiment of a method and device for recycling light without resonance is described below with respect to FIGS. 1A-D and 2A-B. Those skilled in the art will appreciate that the steps and systems described are for exemplary purposes only and are not limited to the specific processes and systems described.

A phased array with true half-wavelength uniform emitter pitch is provided by designing waveguides that are phase mismatched to ensure that nearby waveguides do not couple even over long parallel propagation lengths. This phase mismatch is created by varying the width, and thus effective index, of the waveguides in a regular pattern. In exemplary embodiments, the waveguides are phase-mismatched with both their nearest neighbor and with their second-nearest neighbor as described by Weiwei Song et al., "High-density waveguide superlattices with low crosstalk," Nat. Commun. 6, 7027 (2015), by cycling through a set of, for example, three widths (e.g., 300, 350, and 400 nm, in sequence). As illustrated in FIG. 1B, for the <0.5 mm propagation lengths used experimentally, it was found that coupling between third-nearest neighbors (waveguides with equal width separated by 1.5λ) is negligible and power propagates only in the waveguide it was launched into.

To show phased-array beam forming, a 32-channel end-fire device was fabricated in 250 nm-thick silicon on insulator (FIG. 1C). The input power was equally split among each waveguide using a tree of 1×2 MMI splitters, then the phase on each 400 nm-wide output waveguide was controlled with a thermal phase shifter including a 50 nm-thick platinum wire separated from the waveguide with 1 μm of PECVD $SiO_2$. Heaters were separated laterally by 20 μm to minimize thermal crosstalk. After the phase shifters, each waveguide was tapered to its final width and the waveguides were brought together to the final 775 nm pitch with a nested 90° bend. This waveguide array was routed to the edge of the chip where it emits through a reactive ion etched facet as described by Jaime Cardenas et al., "High coupling efficiency etched facet tapers in silicon waveguides," IEEE Photon. Technol. Lett. 26, 2380-2382 (2014). Each microheater was connected to a bond pad with thick aluminum wires, wire bonded to a printed circuit board, and driven with a channel of a digital to analog converter. FIG. 1D illustrates an optical microscope image of a splitter tree and a thermo-optic phase shifter array.

The phases of the end-fire beam were aligned by placing a single-element photodiode at the desired beam position in the far field (20 cm away from the chip facet) and a gradient-free local maximization algorithm of the type, for example, disclosed by M. J. D. Powell, "An efficient method for finding the minimum of a function of several variables without calculating derivatives," Comput. J. 7, 155-162 (1964), was performed to find the set of phase shifter voltages that maximize power at the detector, in effect maximizing the output Strehl ratio. The angular distribution of output light was then measured by mechanically rotating the same detector about the chip output facet in the waveguide plane. Unlike lens-based Fourier imaging, this mechanical setup allowed measurement of the complete 180° beam pattern because measurement was not limited by the lens numerical aperture.

Figure 2A:
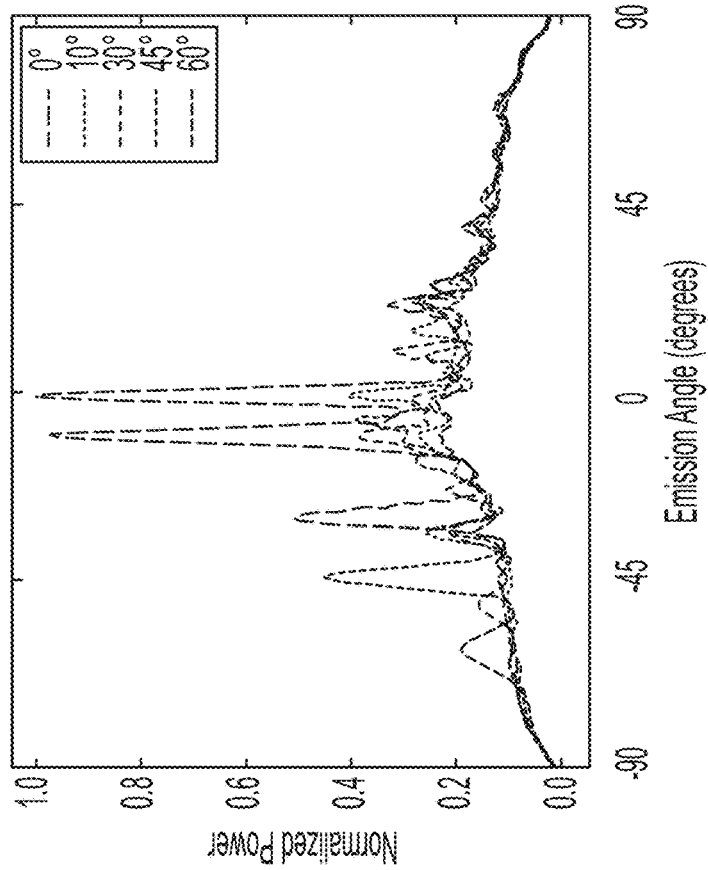
FIG. 2A illustrates measured far-field optical power versus angle for several different beam target angles.

FIG. 2A illustrates grating lobe-free beam formation over the entire 180° field of view using this arrangement. Because only roughly 75% of the phase shifters could be controlled, the measured side lobe level is relatively high, but it can be reduced with better phase control as shown in FIG. 2B. By repeating the optimization process at several different target beam angles, steering of the beam up to 60° off-axis, limited only by the single-waveguide emission envelope and not by aliasing effects, was achieved.

Those skilled in the art will appreciate that the system and method described herein has many applications including light detection and ranging (LIDAR) applications such as beam steering without movable mirrors, direction sensors for self-driving vehicles, and the like. Other applications include free-space optical communications, spatial light modulators, and laser projection displays. Those skilled in the art will further appreciate that the methods described herein may be used with designs for gratings to create a beam scanned in two dimensions.

The present disclosure includes at least the following aspects:

Aspect 1: A method of forming an emitting array of waveguides, comprising configuring a plurality of waveguides that exhibit different propagation constants so as to ensure that nearby waveguides minimize crosstalk over parallel propagation lengths by varying one or more of the width or height of one or more of the plurality of waveguides, whereby at least one of the waveguides is phase-mismatched with at least a nearest and second nearest neighbor. As used herein, nearby may be defined as on or adjacent. As described herein, nearby may comprise nearest neighbor or second nearest neighbor. As used herein, adjacent means on or in proximity to and does not foreclose intervening layers including air or fluid.

Aspect 2: A method of forming an array of segment waveguides having gratings, comprising configuring a plurality of waveguides that exhibit different propagation constants so as to ensure that nearby waveguides minimize crosstalk over parallel propagation lengths by varying one or more of the width or height of one or more of the plurality of waveguides, whereby at least one of the waveguides is phase-mismatched with at least a nearest and second nearest neighbor.

Aspect 3: The method of claim 2, wherein the gratings are configured for each segment's propagation constant to match the direction of emission from all segments.

Aspect 4: The method of any one of aspects 1-3, further comprising disposing one or more metamaterial rods between two or more of the waveguides.

Aspect 5: The method of aspect 4, wherein the metamaterial rods are effective to decrease the crosstalk between the waveguides in the array, allowing for longer propagation length while minimizing crosstalk between the waveguides.

Aspect 6: The method of any one of aspects 1-5, wherein one or more of the width or height of the one or more waveguides is varied periodically across the optical phased array.

Aspect 7: The method of any one of aspects 1-6, wherein the propagation constant comprises a real value, an imaginary value, or a combination thereof.

Aspect 8: The method of any one of aspects 1-2, further comprising one or more dielectric rods disposed adjacent to the waveguides to reduce crosstalk between waveguides, allowing for short pitch between waveguides.

Aspect 9: The method of aspect 5 or 8, wherein the rods comprise a different material than the waveguides.

Aspect 10: The method of aspect 5 or 8, further comprising a cladding disposed adjacent the waveguide, wherein a material forming the rods has a dielectric constant that is larger than a dielectric constant of the cladding of the waveguide, thereby increasing anisotropy along the array length and perpendicular to it.

Aspect 11: A method as in aspect 1, further comprising tapering the waveguides to a tightly-spaced optical phased array having the length in one or more dimensions of respective waveguides in a pattern by tapering each waveguide to its length in one or more dimensions in the pattern and bending each waveguide approximately 90° from an input with equal radii with a position of a bend staggered such that the bend ends with a desired spacing of the waveguides in the pattern.

Aspect 12: A method as in aspect 11, wherein the bend radii is selected whereby a waveguide effective index in the bend is not significantly perturbed from a straight waveguide effective index value and whereby coupling of light into higher modes is substantially avoided.

Aspect 13: An optical phased array comprising a plurality of waveguides that are phase mismatched so as to ensure that adjacent waveguides minimize crosstalk over parallel propagation lengths, the waveguides disposed in an array pattern whereby a length in one or more dimensions of respective waveguides are varied in a pattern such that the respective waveguides are phase-mismatched with at least their nearest neighbor.

Aspect 14: An optical phased array as in aspect 13, wherein the length in one or more dimensions of the respective waveguides are varied periodically in the array pattern.

Aspect 15: An optical phased array as in aspect 13, wherein the respective waveguides are tapered to a tightly-spaced optical phased array having the length in one or more dimensions of the respective waveguide in the pattern, and wherein each respective waveguide is bent from an input with equal radii with a position of a bend staggered such that the bend ends with a desired spacing of the waveguides in the pattern.

Aspect 16: An optical phased array as in aspect 15, wherein the waveguide effective index in the bend is not significantly perturbed from a straight waveguide effective index value.

As an illustrative example, it is understood that conventional operations often use arrays of waveguides/emitters with gratings to achieve two-dimensional beam steering: $1^{st}$ dimension is done by controlling the phase of the light in the emitters and $2^{nd}$ dimension steering is done by varying the input wavelength. This allows for steering the light from the array to any arbitrary point in space. By using the wavelength to steer the beam you considerably reduce the control signals and area.

Figure 6:
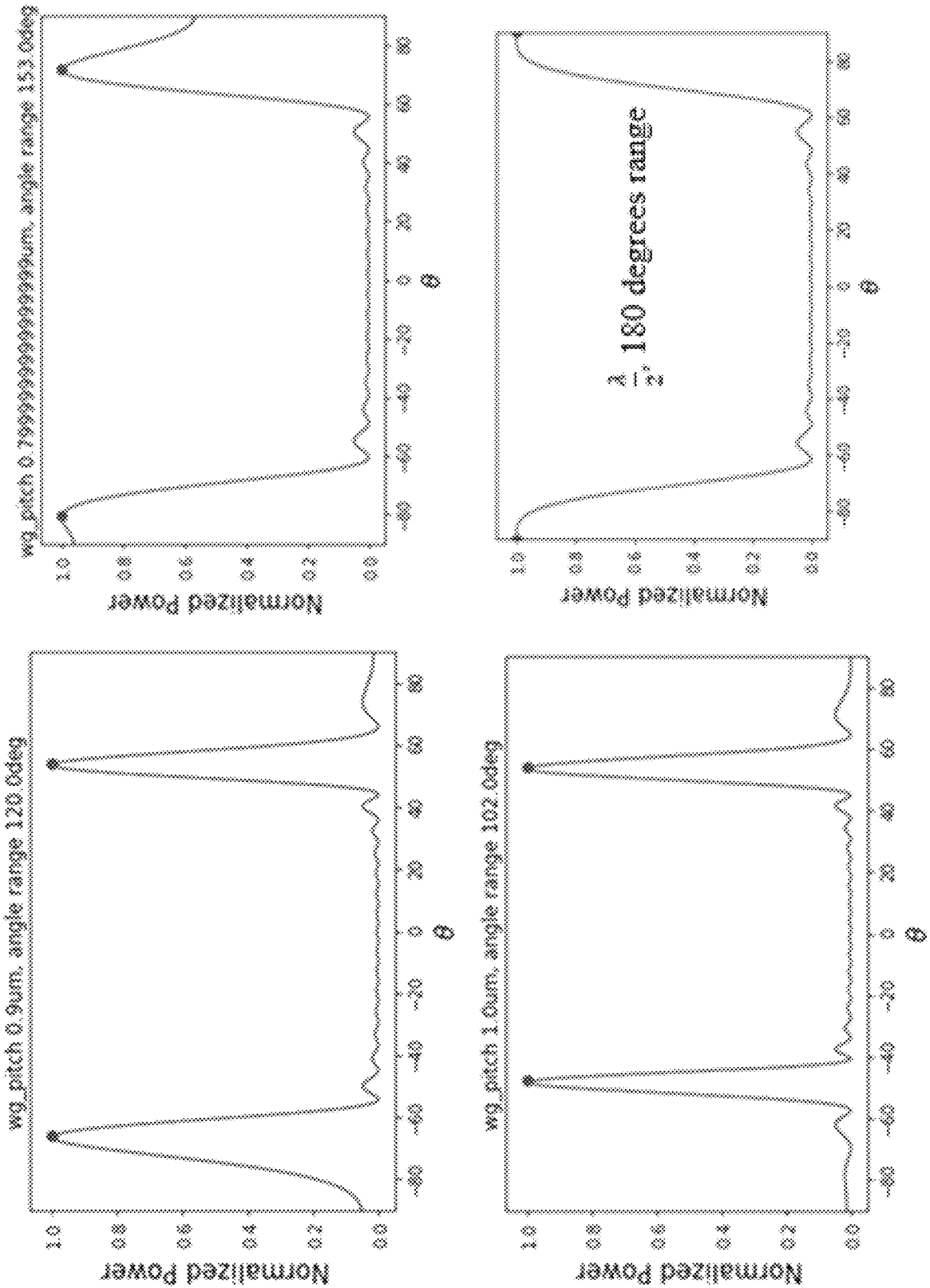
FIG. 6 illustrates power vs. angle as a function of pitch in accordance with aspects of the present disclosure.

The present disclosure allows for a $$\frac{\lambda}{2}$$

spacing between the waveguides. The short spacing may be import for two reasons:
1) It increases the filling factor—percentage of area occupied by emitters/receivers to entire array area in the array. Affect the efficiency of transmitted and received signals
2) Beam steering range—see FIG. 6.

As an illustrative example, the closer the waveguides are placed, the larger the beam steering is and the higher the efficiency of the main beam. However, unlike their Radio Frequency counterparts, pitch (distance between emitters) of existing optical phased array is limited to ~2 μm due the strong crosstalk of the light propagating in the waveguides (in our case, wavelength is usually ~1.5-1.6 μm).

Figure 3:
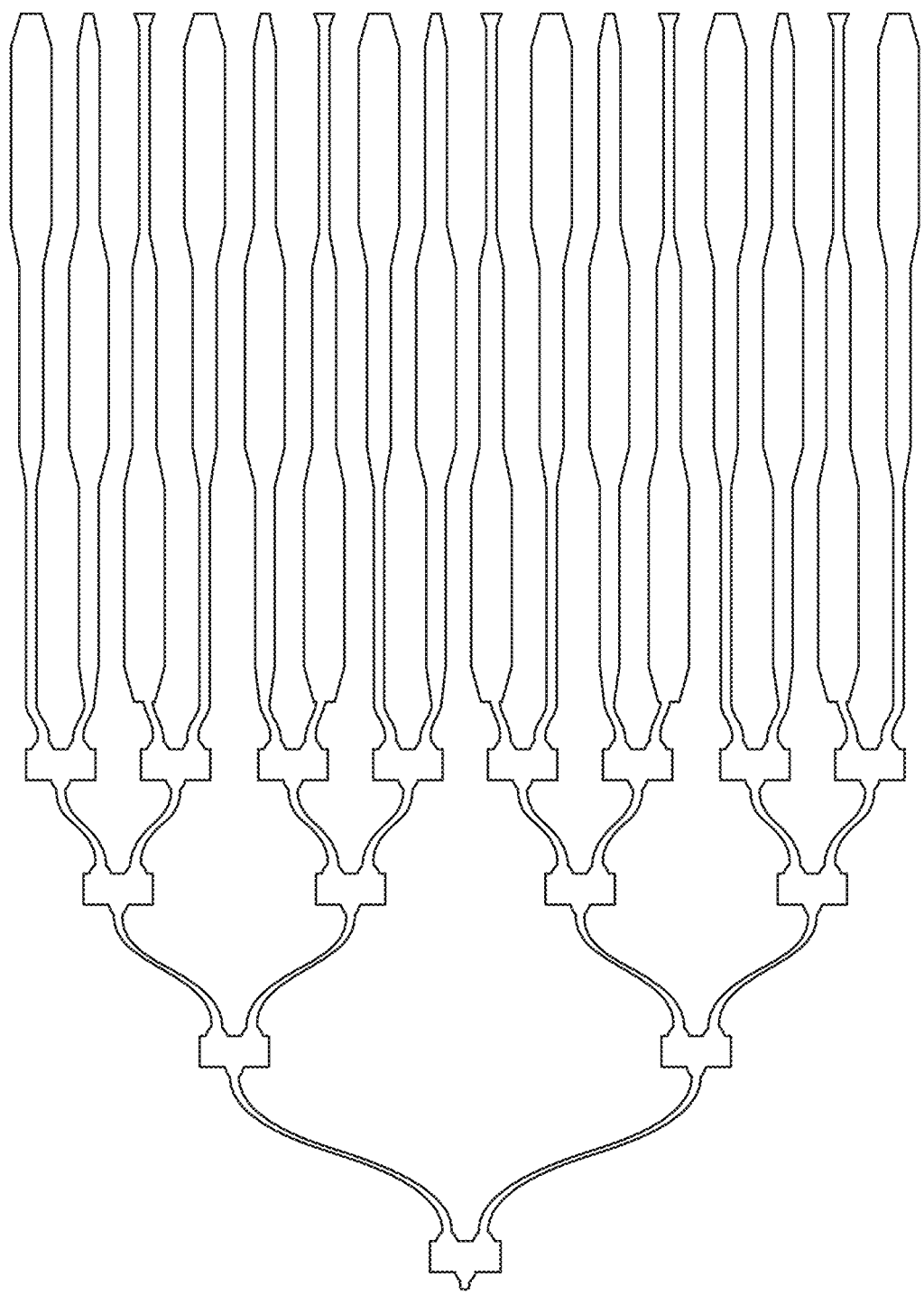
FIG. 3 is a schematic illustrating the alternate widths idea. Widths are cycled along the emitter length reducing the crosstalk while matching the phase velocity.

It is common to use gratings for 2D beam steering, which are sensitive to the phase velocity of light in the emitters. The idea of k-vector mismatch is challenging to implement because it also affects the phase velocity of the light in the emitters. The present disclosure may address these shortcomings by alternating the widths (or any length dimension) of the waveguides along the gratings (See FIGS. 3-5). In order to further reduce the cross talk between waveguides the present disclosure may use metamaterial rods adjacent to the main waveguide.

Figure 4:
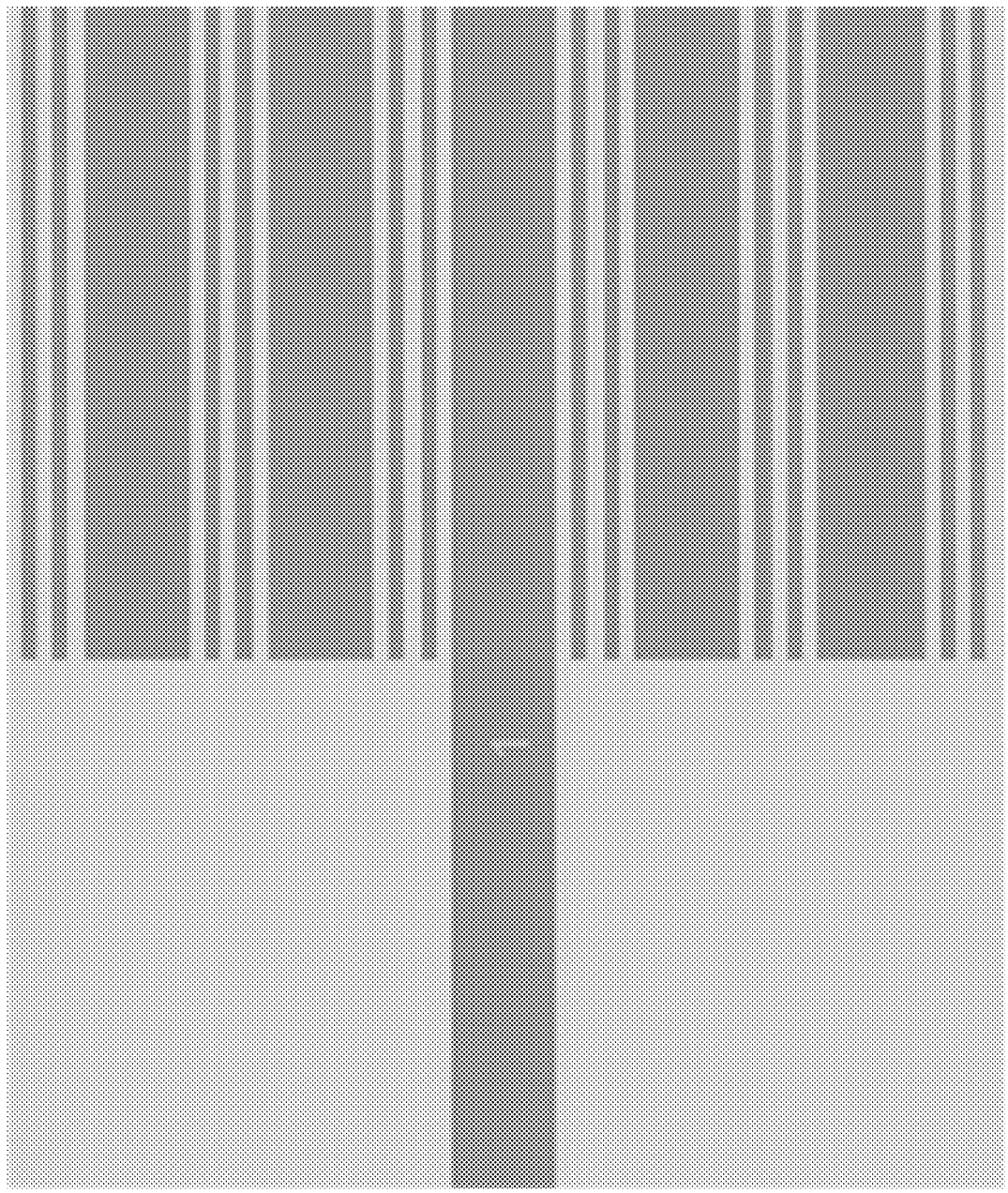
FIG. 4 is a schematic showing main waveguide's, $1^{st}$ neighbors', and $2^{nd}$ neighbors' widths are: 450 nm, 440 nm and 450 nm, respectively and illustrating minimized crosstalk between waveguides with half-wavelength pitch.
Figure 5:
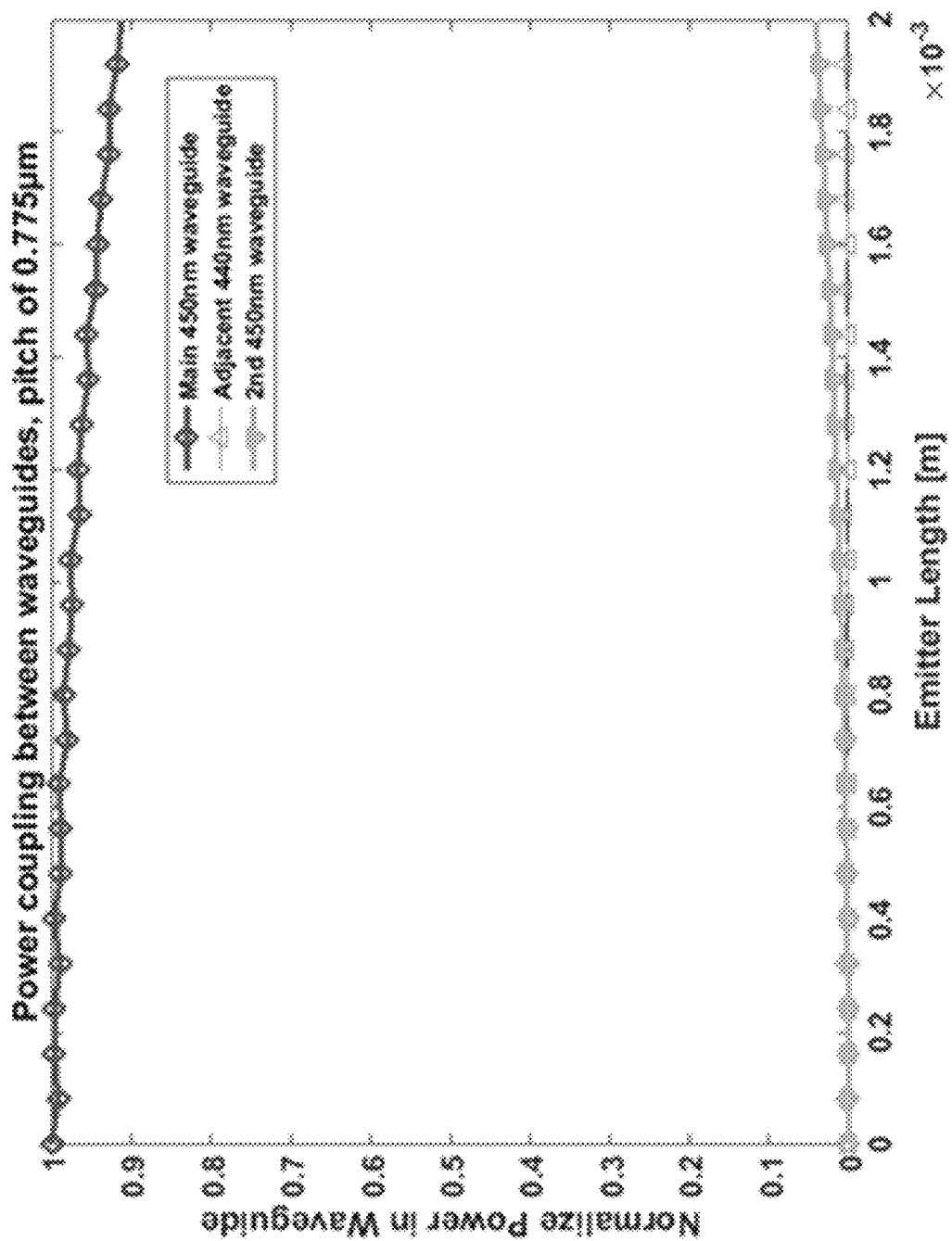
FIG. 5 illustrates coupling between waveguide, where a main waveguide have more than 90% of initial power after 2 millimeters.
Figure 7:
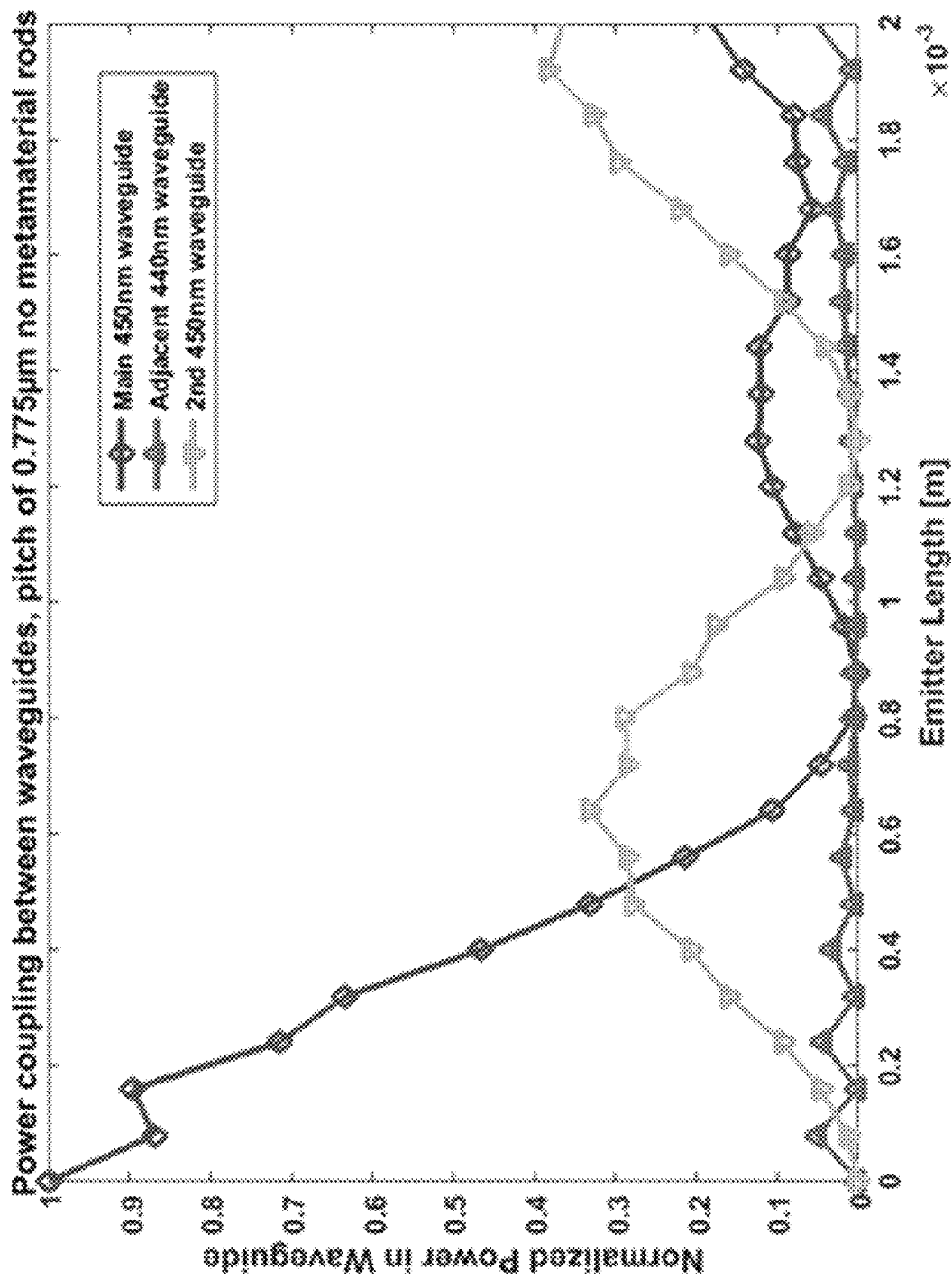
FIG. 7 illustrates coupling without metamaterial rods and showing emitter length due to the large crosstalk between waveguides.

The k vector mismatch combined with the metamaterial rods enable long emitters with low crosstalk at minimal pitch. FIG. 4 has a simulation of cross talk between a main waveguide and $1^{st}$ and $2^{nd}$ neighbor. FIG. 7 shows the large coupling without using the metamaterial rods.

What is claimed:
1. A method of forming an emitting array of waveguides, comprising:
configuring a plurality of waveguides, each including a length divided into segments that exhibit alternating propagation constants so as to ensure that segments of nearby waveguides minimize crosstalk over parallel segment propagation lengths by varying one or more of a width or height of a plurality of the segments of the waveguides,
whereby at least one of the segments of the waveguides is phase-mismatched with at least a nearest neighbor segment of another waveguide.

2. The method of claim 1, wherein one or more of the width or height of the plurality of segments of the waveguides is varied periodically across the array.

3. The method of claim 1, wherein the propagation constant comprises a real value, an imaginary value, or a combination thereof.

4. The method of claim 1, further comprising tapering the waveguides to a tightly-spaced optical phased array having the length in one or more dimensions of respective waveguides in a pattern by tapering each waveguide to its length in one or more dimensions in the pattern and bending each waveguide approximately 90° from an input with equal radii with a position of a bend staggered such that the bend ends with a desired spacing of the waveguides in the pattern.

5. The method of claim 4, wherein the bend radii is selected whereby a waveguide effective index in the bend is not significantly perturbed from a straight waveguide effective index value and whereby coupling of light into higher modes is substantially avoided.

6. The method of claim 1, wherein the lengths of the waveguides are divided into segments of alternating propagations constants such that an average phase velocity of light propagating through all the segments of the length of each waveguide is matched.

7. A method of forming an array of segment waveguides having gratings, comprising:
configuring a plurality of waveguides, each including a length divided into segments that exhibit alternating propagation constants so as to ensure that segments of nearby waveguides minimize crosstalk over parallel segment propagation lengths by varying one or more of a width or height of a plurality of the segments of the waveguides,
whereby at least one of the segments of the waveguides is phase-mismatched with at least a nearest neighbor segment of another waveguide.

8. The method of claim 7, wherein the gratings are configured for each segment's propagation constant to match a direction of emission from all segments.

9. The method of claim 7, wherein one or more of the width or height of the plurality of segments of the waveguides is varied periodically across the array.

10. The method of claim 7, wherein the lengths of the waveguides are divided into segments of alternating propagations constants such that an average phase velocity of light propagating through all the segments of the length of each waveguide is matched.

11. A method of forming an emitting array of waveguides, comprising:
configuring a plurality of waveguides that exhibit different propagation constants so as to ensure that nearby waveguides minimize crosstalk over parallel propagation lengths by varying one or more of a width or height of one or more of the plurality of waveguides, whereby at least one of the waveguides is phase-mismatched with at least a nearest and second nearest neighbor; and
disposing one or more metamaterial rods between two or more of the waveguides.

12. The method of claim 11, wherein the metamaterial rods are effective to decrease the crosstalk between the waveguides in the array, allowing for longer propagation length while minimizing crosstalk between the waveguides.

13. The method of claim 12, wherein the rods comprise a different material than the waveguides.

14. The method of claim 12, wherein a cladding is disposed adjacent the waveguide, wherein a material forming the rods has a dielectric constant that is larger than a dielectric constant of the cladding of the waveguide, thereby increasing anisotropy along the array length and perpendicular to it.

15. A method of forming an emitting array of waveguides, comprising:
   configuring a plurality of waveguides that exhibit different propagation constants so as to ensure that nearby waveguides minimize crosstalk over parallel propagation lengths by varying one or more of a width or height of one or more of the plurality of waveguides, whereby at least one of the waveguides is phase-mismatched with at least a nearest and second nearest neighbor; and
   disposing one or more dielectric rods adjacent to the waveguides to reduce crosstalk between waveguides, allowing for short pitch between waveguides.

16. The method of claim 15, wherein the rods comprise a different material than the waveguides.

17. The method of claim 15, further comprising a cladding disposed adjacent the waveguide, wherein a material forming the rods has a dielectric constant that is larger than a dielectric constant of the cladding of the waveguide, thereby increasing anisotropy along the array length and perpendicular to it.

18. An optical phased array, comprising:
   a plurality of waveguides, each including a length divided into segments that are phase mismatched so as to ensure that segments of adjacent waveguides minimize crosstalk over parallel segment propagation lengths,
   the waveguides disposed in an array pattern whereby a length in one or more dimensions of respective segments of the waveguides are varied in a pattern such that the respective segments of the waveguides are phase-mismatched with at least their nearest neighbor segments.

19. The optical phased array of claim 18, wherein the length in one or more dimensions of the respective segments of the waveguides are varied periodically in the array pattern.

20. The optical phased array of claim 18, wherein the respective waveguides are tapered to a tightly-spaced optical phased array having the length in one or more dimensions of the respective waveguide in the pattern, and wherein each respective waveguide is bent from an input with equal radii with a position of a bend staggered such that the bend ends with a desired spacing of the waveguides in the pattern.

21. The optical phased array of claim 20, wherein a waveguide effective index in the bend is not significantly perturbed from a straight waveguide effective index value.

22. The optical phased array of claim 18, wherein the lengths of the waveguides are divided into segments such that an average phase velocity of light propagating through all the segments of the length of each waveguide is matched.

23. A method of forming an array of segment waveguides having gratings, comprising:
   configuring a plurality of waveguides that exhibit different propagation constants so as to ensure that nearby waveguides minimize crosstalk over parallel propagation lengths by varying one or more of a width or height of one or more of the plurality of waveguides, whereby at least one of the waveguides is phase-mismatched with at least a nearest and second nearest neighbor; and
   disposing one or more metamaterial rods between two or more of the waveguides.

24. The method of claim 23, wherein the metamaterial rods are effective to decrease the crosstalk between the waveguides in the array, allowing for longer propagation length while minimizing crosstalk between the waveguides.

25. The method of claim 24, wherein the rods comprise a different material than the waveguides.

26. The method of claim 24, further comprising a cladding disposed adjacent the waveguide, wherein a material forming the rods has a dielectric constant that is larger than a dielectric constant of the cladding of the waveguide, thereby increasing anisotropy along the array length and perpendicular to it.

27. A method of forming an array of segment waveguides having gratings, comprising:
   configuring a plurality of waveguides that exhibit different propagation constants so as to ensure that nearby waveguides minimize crosstalk over parallel propagation lengths by varying one or more of a width or height of one or more of the plurality of waveguides, whereby at least one of the waveguides is phase-mismatched with at least a nearest and second nearest neighbor; and
   disposing one or more dielectric rods adjacent to the waveguides to reduce crosstalk between waveguides, allowing for short pitch between waveguides.

28. The method of claim 27, wherein the rods comprise a different material than the waveguides.

29. The method of claim 27, further comprising a cladding disposed adjacent the waveguide, wherein a material forming the rods has a dielectric constant that is larger than a dielectric constant of the cladding of the waveguide, thereby increasing anisotropy along the array length and perpendicular to it.

* * * * *